(12) United States Patent
Kato et al.

(10) Patent No.: US 7,642,901 B2
(45) Date of Patent: Jan. 5, 2010

(54) VEHICLE DISPLAY APPARATUS (75) Inventors: Miki Kato, Kariya (JP); Tsuneo Uchida, Okazaki (JP); Kiyotaka Taguchi, Kariya (JP); Yoshinori Watanabe, Obu (JP); Hidehiko Kawakami, Nagoya (JP)

(73) Assignee: DENSO CORPORATION, Kariya (JP)

( * ) Notice: Subject to any disclaimer, the term of this patent is extended or adjusted under 35 U.S.C. 154(b) by 388 days.

(21) Appl. No.: 11/543,091

(22) Filed: Oct. 5, 2006

(65) Prior Publication Data
US 2007/0085708 A1    Apr. 19, 2007

(30) Foreign Application Priority Data
Oct. 13, 2005    (JP)    ............................. 2005-298912
Feb. 16, 2006    (JP)    ............................. 2006-039436

(51) Int. Cl.
*B60Q 1/00*    (2006.01)
(52) U.S. Cl. .................... 340/438; 340/425.5; 340/439; 340/461; 340/691.1; 340/691.6; 340/815.4; 345/87; 362/23
(58) Field of Classification Search ................ 340/438, 340/439, 457, 461, 425.5, 691.1, 691.6, 815.4; 701/1, 29, 31; 345/7, 156, 173, 87; 362/23
See application file for complete search history.

(56) References Cited

U.S. PATENT DOCUMENTS

| | | | | |
|---|---|---|---|---|
| 5,757,268 A | * | 5/1998 | Toffolo et al. | ............... 340/461 |
| 6,434,450 B1 | * | 8/2002 | Griffin et al. | ................... 701/1 |
| 6,909,407 B1 | * | 6/2005 | Schradi et al. | ................. 345/7 |
| 7,123,135 B2 | | 10/2006 | Kaneda | |
| 7,269,482 B1 | * | 9/2007 | Shultz et al. | ................... 701/1 |
| 7,317,385 B2 | * | 1/2008 | Campbell | ................... 340/438 |

FOREIGN PATENT DOCUMENTS

| | | |
|---|---|---|
| DE | 19947506 A1 | 4/2001 |
| JP | A-05-189700 | 7/1993 |
| JP | B2-8-14500 | 2/1996 |
| JP | A-11-51686 | 2/1999 |
| JP | A-11-311545 | 11/1999 |
| JP | A-2000-180198 | 6/2000 |
| JP | A-2004-157434 | 6/2004 |
| JP | A-2004-251722 | 9/2004 |

OTHER PUBLICATIONS

Office Action mailed Sep. 1, 2009 from the Japan Patent Office for corresponding Japanese patent application No. 2006-039436 (English translation enclosed).

* cited by examiner

*Primary Examiner*—Davetta W Goins
(74) *Attorney, Agent, or Firm*—Posz Law Group, PLC (57) ABSTRACT

When an ignition switch is turned on to display an image on a display apparatus, the display apparatus first displays a needle image of meter images and a warning indicator image. Out of the meter images, the display apparatus displays the needle image for a specified time period (e.g., 0.2 seconds), and then displays a dial image. After displaying the dial image for a specified time period, the display apparatus displays a navigation image. The specified time period may be set to 0.5 through 1.0 second, for example, long enough to visually check or recognize display of the meter image and the warning indicator image. Accordingly, it is possible to visually check the meter image and the warning indicator image while the navigation image is not displayed.

21 Claims, 7 Drawing Sheets

VEHICLE DISPLAY APPARATUS

CROSS REFERENCE TO RELATED APPLICATION

This application is based on and incorporates herein by reference Japanese Patent Applications No. 2005-298912 filed on Oct. 13, 2005 and No. 2006-39436 filed on Feb. 16, 2006. This application is also related to U.S. application Ser. No. 11/543,090, entitled "VEHICLE DISPLAY APPARATUS," filed on Oct. 5, 2006.

FIELD OF THE INVENTION

The present invention relates to a vehicle display apparatus that is placed near a driver and displays visual information about a meter and navigation.

BACKGROUND OF THE INVENTION

A navigation apparatus outputs visual information such as map, route, and facility information. Generally, the visual information is displayed on a display apparatus such as a liquid crystal display provided for a vehicle's center console. In this manner, the visual information is transmitted to the driver. Such display apparatus provided for the center console necessitates the driver to frequently move his or her line of sight. The driver may overlook the information displayed on the display apparatus.

To solve this problem, the proposed technologies display navigation images in an instrument panel (see patent documents 1, 2, and 3).

For example, the technology disclosed in patent document 1 provides a display apparatus, which uses a whole instrument panel without a mechanical meter. The display apparatus displays a needle-type meter image (analog meter image). The display apparatus displays a navigation image as well as the meter image, allowing a driver to view both images with minimal movement of his or her line of sight.

The technology disclosed in patent document 2 also provides a display apparatus in an instrument panel. The display apparatus displays both a digital meter image and a navigation image. Also in this case, a driver can view the meter image and the navigation image with minimal movement of his or her line of sight.

The technology disclosed in patent document 3 provides a liquid crystal display apparatus between mechanical meters. The liquid crystal display apparatus displays a navigation image. Also in this case, a driver can view the meter indication and the navigation image with minimal movement of his or her line of sight within the same instrument panel.

Patent Document 1: JP-2004-157434A
Patent Document 2: JP-H11-51686A
Patent Document 3: JP-2004-251722A The above-mentioned technologies disclose or suggest no consideration for a time sequence to display the navigation image in the instrument panel in relation to the meter image or indication.

Let us compare the meter image or indication (hereafter referred to as a meter image or the like) with the navigation image. The meter image or the like provides more important information for a driver.

When the meter image or the like and the navigation image are displayed simultaneously, the driver may less attentively recognize the meter image or the like that should be more important than the navigation image. The navigation image especially attracts the driver's attention. For example, a map display generally contains a large amount of information, provides a fine image, and uses many colors. Consequently, the driver tends to less attentively recognize the meter image or the like than the navigation image.

Simultaneously displaying the meter image or the like and the navigation image provides an unattractive visual effect and tends to make a driver inattentive to a display content.

SUMMARY OF THE INVENTION

The present invention has been made in consideration of the foregoing. It is therefore an object of the present invention to provide a vehicle display apparatus capable of increasing driver's attention to a more important meter image or the like and promoting driver's concern for a display content by means of a visual effect when the inside of an instrument panel is used to display both a relatively more prioritized image such as the meter image and a relatively less prioritized image such as a navigation image.

According to an aspect of the present invention, a vehicle display apparatus is provided as follows. Display means is included in an instrument panel to have (i) a first display area for displaying a first image corresponding to relatively highly prioritized content and (ii) a second display area for displaying a second image corresponding to relatively less prioritized content. Control means is included to provide control (i) to allow the first image to become visibly distinctive at initiation of power supply and (ii) to allow the second image to be less distinctive than the first image until a specified time period, which starts from the initiation of power supply, elapses to allow the first image to be recognizable.

According to another aspect of the present invention, a vehicle display apparatus is provided as follows. A light source is included to illuminates a mechanical meter in an instrument panel. Display means is provided in the instrument panel. Control means is included. The control means provides (i) light control to turn on the light source to illuminate the mechanical meter at initiation of power supply and (ii) display control to cause the display means to display a predetermined image to be less distinctive than the mechanical meter until a specified time period, which starts from the initiation of power supply, elapses to allow the mechanical meter to be recognizable.

According to yet another aspect of the present invention, a method for displaying images in an instrument panel in a vehicle is provided with the following: (i) causing a first image, which corresponds to relatively highly prioritized content in a first display area in the instrument panel, to become visibly distinctive from initiation of power supply; and (ii) causing a second image, which corresponds to relatively less prioritized content in a second display area in the instrument panel, to be less distinctive than the first image until a specified time period, which starts from the initiation of power supply, elapses to allow the first image to be recognizable.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Embodiments of the present invention will be described in further detail with reference to the accompanying drawings. The invention is not limited to the following describes embodiments but may be otherwise variously embodied within the spirit and scope of the invention.

1. First Embodiment (Construction Description)

Figure 1:
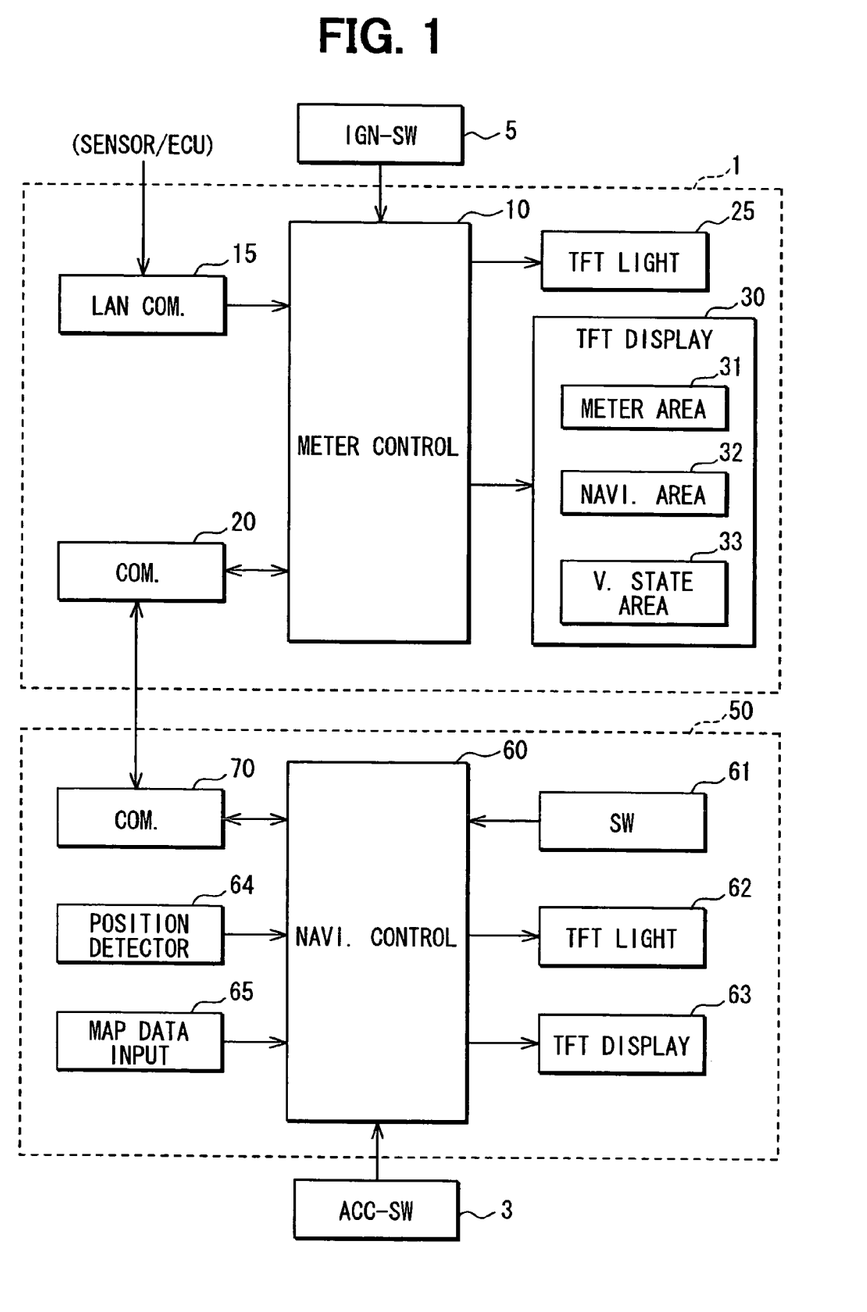
FIG. 1 is a block diagram showing an overview construction of a vehicle display apparatus according to a first embodiment and a navigation apparatus connected thereto.
Figure 2:
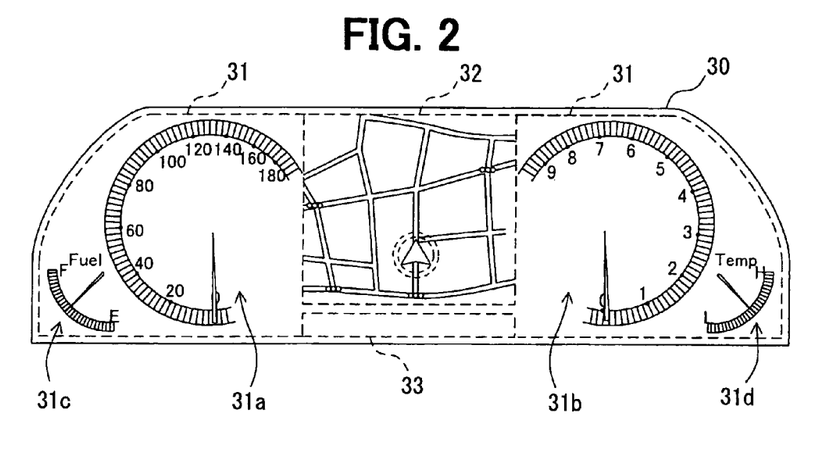
FIG. 2 is a front view of the vehicle display apparatus according to the first embodiment.

FIG. 1 is a block diagram showing an overview construction of a vehicle display apparatus 1 according to a first embodiment and a navigation apparatus 50 connected thereto. FIG. 2 is a front view of the vehicle display apparatus 1. The vehicle display apparatus 1 and the navigation apparatus 50 include the following components and are mounted on a vehicle for use. The vehicle display apparatus 1 will be first described.

<Construction of the Vehicle Display Apparatus 1>

The vehicle display apparatus 1 includes a meter control unit 10, an interior LAN (Local Area Network) communication unit 15, a communication unit 20, a TFT (Thin Film Transistor) light source 25, and a TFT (Thin Film Transistor) display device 30.

The interior LAN communication unit 15 provides communication between various ECUs (Electronic Control Units) and alarm sensors connected to an interior LAN (not shown). The ECUs include an engine ECU and an AT (Automatic Transmission)-ECU, for example. The alarm sensors include a brake warning indicator, an oil pressure warning indicator, an exhaust temperature warning indicator, a battery warning indicator, an ABS (Antilock Brake System) warning indicator, an engine warning indicator, and a door warning indicator.

The communication unit 20 is connected to the navigation apparatus 50 to implement communication with the navigation apparatus 50. Specifically, the communication unit 20 is connected to a communication unit 70 of the navigation apparatus 50. The communication unit 20 chiefly receives image data for navigation images displayed on the TFT display device 30.

The TFT light source 25 is a light source for the TFT display device 30.

The TFT display device 30 is mounted in an instrument panel (not shown) and includes a liquid crystal display or an organic EL display. The TFT display device 30 has a color image display function. As shown in FIG. 2, a display area of the TFT display device 30 can be divided into a meter display area 31, a navigation display area 32, and a vehicle state display area 33.

The meter display area 31 simulates an analog meter to display images representing a vehicle speed, engine revolution, fuel level, coolant temperature, and the like acquired from various ECUs (not shown) via the interior LAN communication unit 15. FIG. 2 shows the meter display area 31 according to the embodiment. Viewed from the driver, the left part of the meter display area 31 displays a speed meter image 31a and a fuel level meter image 31c. Viewed from the driver, the right part of the meter display area 31 displays a tachometer image 31b and a coolant temperature meter image 31d.

The navigation display area 32 displays navigation images acquired from the navigation apparatus 50 via the communication unit 20. For example, the navigation images include a map surrounding the current position, an icon representing the current position, and a guidance chart for route guidance.

For example, the vehicle display apparatus 1 acquires alarm sensor states from various alarm sensors (not shown) via the interior LAN communication unit 15. These states provide information indicating whether or not an alarm is needed. When an alarm is needed, the vehicle state display area 33 displays the alarm as a warning indicator image corresponding to the alarm sensor. The warning indicator image diagrammatically represents the warning indicator such as the brake warning indicator, the oil pressure warning indicator, the exhaust temperature warning indicator, the battery warning indicator, the ABS warning indicator, the engine warning indicator, and the door warning indicator. The image itself is well known and a detailed description is omitted.

The vehicle state display area 33 may display not only the above-mentioned warning indicator image, but also an image representing a shift position. When a vehicle has an autocruise control feature, for example, the vehicle state display area 33 may display various images associated with the feature. Information to display these images only needs to be acquired from AT-ECU or ACC (Adapted Cruise Control)-ECU via the interior LAN communication unit 15. The following description assumes that the vehicle state display area 33 displays only the warning indicator image.

The meter control unit 10 chiefly includes a known microcomputer composed of a CPU, ROM, RAM, SRAM, I/O, and a bus line connecting these components. The meter control unit 10 performs various processes based on programs stored in the ROM and the RAM. For example, the meter control unit 10 receives data from various ECUs via the interior LAN communication unit 15 and allows the TFT display device 30 to display the vehicle speed, engine revolution, fuel level, and coolant temperature in an analog fashion on the meter display area 31. The meter control unit 10 uses image data transmitted from the navigation apparatus 50 and allows the TFT display device 30 to display a map image on the navigation display area 32. The meter control unit 10 acquires alarm sensor states from the various alarm sensors via the interior LAN communication unit 15 and allows the TFT display device 30 to display a warning indicator image indicating the contents of the alarm, when needed, on the vehicle state display area 33.

An ignition (IGN) switch 5 is also connected to the meter control unit 10. When a driver operates an ignition key to turn on the IGN switch 5, the vehicle display apparatus 1 is supplied with the power to activate the components thereof. Turning on the IGN switch 5 is not limited to the operation of rotating the ignition key When a user owns the so-called Smart Key, he or she may turn on the IGN switch by rotating a knob or pressing a button.

<Construction of the Navigation Apparatus 50>

The navigation apparatus 50 includes a navigation control unit 60, an operation switch group 61, a TFT light source 62, a TFT display device 63, a position detector 64, a map data input device 65, and a communication unit 70. The operation switch group 61 is used for a user to enter various instructions. The position detector 64 detects a vehicle's current position. The map data input device 65 supplies data from a map storage medium that records map data and voice data. The communication unit 70 provides a function to communicate with the vehicle display apparatus 1.

The operation switch group 61 includes a touch panel also used as the display surface of the TFT display device 63 and mechanical key switches provided around the TFT display device 63. The operation switch group 61 is used to input various instructions from a driver. The touch panel and the TFT display device 63 are integrally layered. The touch panel may be available as any one of pressure sensitive, electromagnetic induction, and capacitance systems, or a combination of these.

The TFT light source 62 is a light source for the TFT display device 63. The TFT display device 63 is mounted in a center console (not shown) and includes a liquid crystal display or an organic EL display. The TFT display device 63 has a color image display function. A mark indicating the current location can be specified from the vehicle's current position detected by the position detector 64 and map data supplied from the map data input device 65. The TFT display device 63 can display that mark in overlap with additional data such as a guiding route to a destination, names, spots, and various facility marks. The facility guidance can be also displayed.

The position detector 64 is provided with a GPS (Global Positioning System) receiver, a gyroscope, and a distance sensor. The GPS receiver receives radio waves from an artificial satellite for GPS via a GPS antenna (not shown) and outputs a received signal. The gyroscope detects the magnitude of rotational motion applied to a vehicle. The distance sensor detects a traveled distance based on the acceleration or the like in the forward and backward directions of the vehicle. The navigation control unit 60 calculates the vehicle position, orientation, speed, and the like based on output signals from these sensors.

The communication unit 70 is connected to the vehicle display apparatus 1 to implement communication with the vehicle display apparatus 1. Specifically, the communication unit 70 is connected to the communication unit 20 of the vehicle display apparatus 1. The communication unit 70 chiefly transmits image data for images displayed on the vehicle display apparatus 1.

The map data input device 65 is supplied with various data from a map data storage medium (not shown) such as a hard disk and DVD-ROM. The map data storage medium stores map data (node data, link data, cost data, background data, road data, name data, mark data, intersection data, facility data, and the like), audio data for guidance, voice recognition data, and the like. These data may be supplied via a network instead of using the map data storage medium.

The navigation control unit 60 is mainly constructed of a known microcomputer including a CPU, ROM, RAM, SRAM, I/O, and a bus line connecting these components. The navigation control unit 60 performs various processes based on programs stored in the ROM and the RAM. As an example, the navigation control unit 60 calculates the vehicle's current position as a set of coordinates and a traveling direction based on signals detected by the position detector 64. The navigation control unit 60 allows the TFT display device 63 to display a map and the like surrounding the current position read through the map data input device 65. As another example, the navigation control unit 60 performs a route calculation process to calculate an optimum route from the current position to a destination based on map data and the destination. The map data is stored in the map data input device 65. The destination is determined in accordance with operations of the operation switch group 61. As still another example, the navigation control unit 60 performs a route guidance process to guide the route by allowing the TFT display device 63 to display the calculated route.

The navigation control unit 60 also connects with an accessory (ACC) switch 3. When the driver operates the ignition key to turn on the ACC switch 3, the navigation apparatus 50 is supplied with the power to enable the components thereof to operate.

(Description of Operations and Effects)

Operations of the vehicle display apparatus 1 will be described with reference to a time chart in FIG. 3. The following description contains only necessary operations of the navigation apparatus 50 in relation to the vehicle display apparatus 1.

Figure 3:
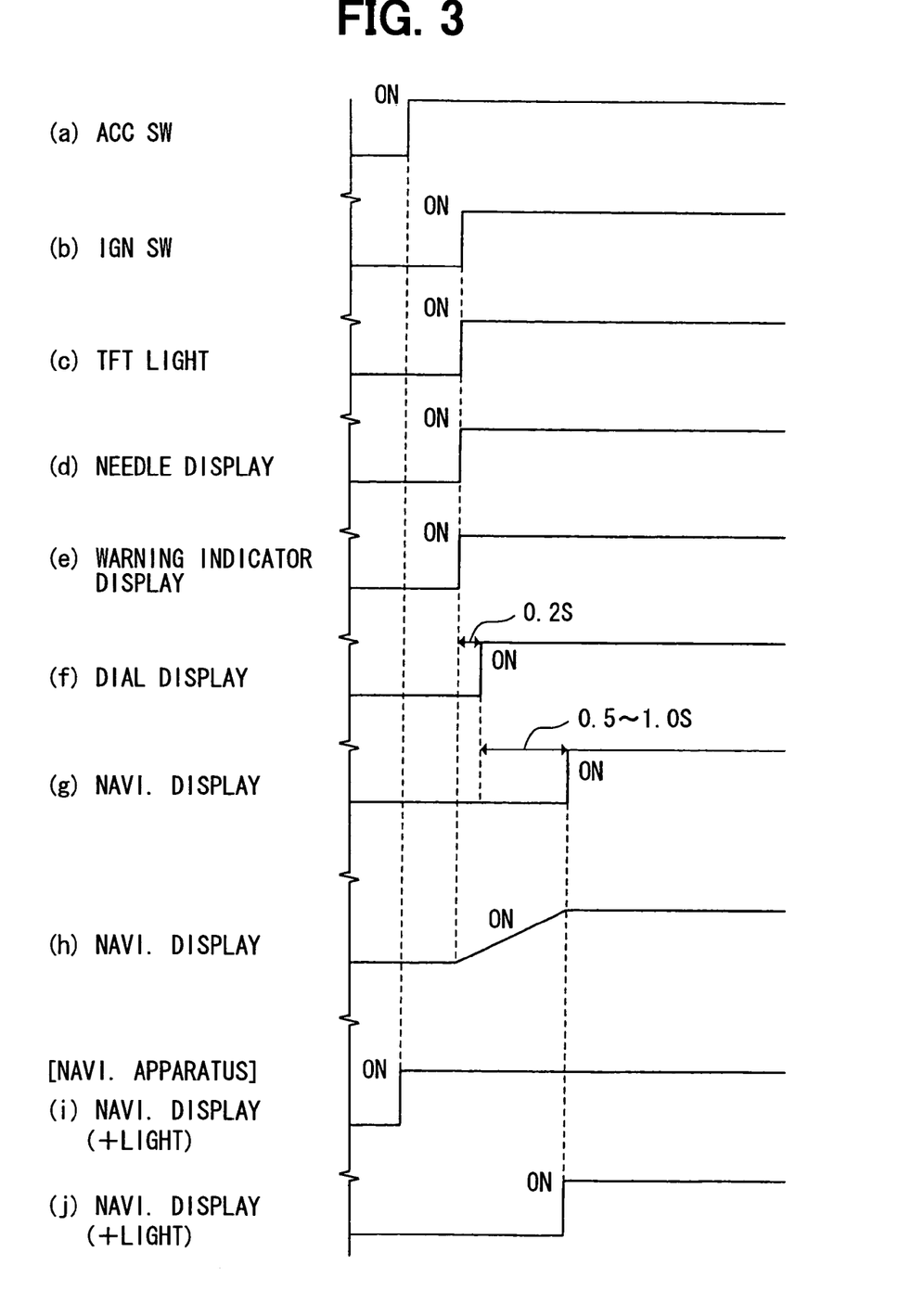
FIG. 3 is a time chart showing an operation of the vehicle display apparatus according to the first embodiment.

When the driver operates the ignition key to turn on the accessory (ACC) switch (see (a) in FIG. 3), the components of the navigation apparatus 50 become ready for operation. The navigation control unit 60 turns on the TFT light source 62 and starts displaying a navigation image on the TFT display device 63 (see (i) in FIG. 3).

When the driver further operates the ignition key to turn on the ignition (IGN) switch (see (b) in FIG. 3), the components of the vehicle display apparatus 1 become ready for operation. The meter control unit 10 turns on the TFT light source 25 (see (c) in FIG. 3) and starts displaying images on the TFT display device 30.

The TFT display device 30 displays meter images (speed meter image 31a, tachometer image 31b, fuel level meter image 31c, and coolant temperature meter image 31d) in the meter display area 31 (see (d) and (f) in FIG. 3 for the display time sequence) and a warning indicator image in the vehicle state display area 33 ((e) in see FIG. 3 for the display time sequence) earlier than a navigation image in the navigation display area 32 (see (g) in FIG. 3 for the display time sequence). The following describes a specific display sequence.

As shown in (d) and (e) in FIG. 3, the TFT display device 30 first displays needle images of the meter images (speed meter image 31a, tachometer image 31b, fuel level meter image 31c, and coolant temperature meter image 31d) and a warning indicator image in the vehicle state display area 33. Of the meter image, the TFT display device 30 displays the needle image, and then a dial image after lapse of a specified time period (e.g., 0.2 seconds) as shown in (f) in FIG. 3.

The TFT display device 30 displays the dial image for a specified time period, and then displays the navigation image in the navigation display area 32 as shown in (g) in FIG. 3. The specified time period may be set to 0.5 through 1.0 second, for example, long enough to visually check the display of the meter images and the warning indicator image. Though the time period may be longer, the navigation image display delays correspondingly. It may be a good practice to assign the time period only long enough to visually check the display of the meter images and the warning indicator image. The above-mentioned time period of 0.5 through 1.0 second is considered optimal.

As mentioned above, the TFT display device 30 starts displaying the meter images and the warning indicator image but does not display the navigation image at that point. The TFT display device 30 displays the navigation image only after lapse of the specified time period long enough to visually check the meter images and the warning indicator image. The user can visually check the meter images 31*a* through 31*d* and the warning indicator image while the navigation image is not displayed. The inside of the instrument panel may be used for mixed display of the meter images 31*a* through 31*d*, the warning indicator image, and the navigation image. In such case, it is possible to increase driver's attention to the more important meter images 31*a* through 31*d* and the warning indicator image.

It is especially necessary to confirm whether or not all the warning indicator images are displayed at an initial state. That is, the meter control unit 10 displays the warning indicator images based on detection results from the sensors corresponding to the warning indicators. When the IGN switch 5 is turned on, the meter control unit 10 once displays all the warning indicator images to check the initial state. When the initial state is normal, the meter control unit 10 does not display all the warning indicator images thereafter. Accordingly, it is preferable to ensure the specified time period for preventing the navigation image from being displayed so that the driver can visually confirm that all the warning indicator images are displayed at the initial state. The embodiment displays the navigation image 0.7 through 1.2 seconds after the warning indicator image is displayed. The driver can more carefully watch the warning indicator image until the navigation image is displayed.

The meter control unit 10 once displays all the warning indicator images to check the initial state and does not display them thereafter unless actually needed. When the IGN switch 5 remains turned on for a specified time period such as three seconds, for example, the meter control unit 10 does not automatically display the warning indicator images. When the engine starts, the meter control unit 10 does not automatically display the warning indicator images. A known technique can be used for processes after the warning indicator image is displayed. This is not a mainstream of the invention and a detailed description is omitted.

Simultaneously displaying the meter images 31*a* through 31*d*, the warning indicator image, and the navigation image provides an unattractive visual effect and tends to make a driver inattentive to a display content. Displaying those images with time lags may enhance the visual effect. The driver can be given a fresh impression. As a result, it is also possible to promote the driver's concern for the display contents.

With respect to the meter images 31*a* through 31*d*, the TFT display device 30 displays the needle images for a specified time period (e.g., 0.2 seconds), and then displays the dial image. In this manner, the TFT display device 30 first displays the needle of the meter image without the dial, and then displays the dial. This further enhances the visual effect and promotes the driver's concern for the meter images 31*a* through 31*d*.

Let us suppose that turning on the accessory (ACC) switch activates the navigation apparatus 50. There may be a case of displaying a first opening image presenting the navigation apparatus' manufacturer name and product name, and then a map image and the like. The opening image belongs to the navigation image and is therefore one of "images for less prioritized contents." In such case, the navigation apparatus displays the meter images and the warning indicator image for a specified time period long enough for visual recognition, then the opening image, and finally the map image and the like.

(Modifications)

(1) According to the above-mentioned description, the TFT display device 30 starts displaying the meter images 31*a* through 31*d* in preference to the navigation image or the warning indicator image. However, there may be a need for increasing driver's attention to more important meter images and vehicle state images. In such case, the TFT display device 30 may start displaying the meter images 31*a* through 31*d* or the warning indicator image and then make the navigation image relatively indistinctive for a specified period.

There may be provided display control as shown in (h) in FIG. 3. That is, turning on the IGN switch 5 starts displaying the navigation image itself. However, the brightness of the navigation image is increased gradually. Control is provided to display the dial image of the meter images 31*a* through 31*d* for a specified time period (e.g., 0.5 through 1.0 second), and then maximize the brightness of the navigation image. This control provides the same effect. Gradually increasing the brightness of the navigation image can provide a user with an impression that the navigation image gradually becomes clear. This is also preferable for the visual effect.

In the above-mentioned description, turning on the IGN switch 5 starts displaying the navigation image. However, the invention is not limited to this start time point. The purpose is to increase driver's attention to the more important meter images 31*a* through 31*d* and warning indicator image. It only needs to control displaying the dial image of the meter images 31*a* through 31*d* for a specified time period (e.g., 0.5 through 1.0 second), and then maximizing the brightness of the navigation image.

Furthermore, another method may be used to make one image or display less distinctive than the other image or display. For instance, a first image may be displayed in tint monochrome at a start point and then displayed in color after a specified time period. In contrast, a second image may be displayed in color from the start point.

(2) In the above-mentioned description, the display sequence is the needle image, the dial image, and the navigation image. The display sequence may be the needle image, the navigation image, and the dial image, for example. When displaying the needle-type meter images 31*a* through 31*d* as meter images, the needle is first displayed for a specified time period (e.g., 0.5 through 1.0 second) long enough to visually recognize the display of the meter images 31*a* through 31*d* associated with the needle. After the specified time period elapses, the navigation image is displayed. After another specified time period elapses, the dial image is displayed.

As mentioned above, the visual effect can be achieved by sequentially displaying the images one by one, not all the images at a time. The purpose is to increase driver's attention to the more important meter images 31*a* through 31*d*. Both the needle and the dial need not be always displayed to achieve this purpose. However, at least the needle may need to be displayed. Accordingly, it may be preferable to display the needle image, the navigation image, and the dial image in order. The navigation image may be left hidden until lapse of the specified time period long enough to visually confirm the needle display.

(3) As shown in (a) in FIG. 3, turning on the accessory (ACC) switch makes the components of the navigation apparatus 50 ready for operation. The example in (i) in FIG. 3 turns on the TFT light source 62 at that point and starts displaying the navigation image on the TFT display device 63. However, this display process does not synchronize with the time sequence to display the navigation image in the navigation display area 32 of the TFT display device 30 in the vehicle display apparatus 1.

It may be preferable to synchronously display both navigation images. In this case, a solution is to delay the time point to display the navigation image on the TFT display device 63 of the navigation apparatus 50. This display time point matches the time point to display the navigation image in the navigation display area 32 of the TFT display device 30 of the vehicle display apparatus 1.

Both navigation images may be synchronously displayed as follows. For example, the navigation control unit 60 of the navigation apparatus 50 transmits a synchronization signal via the communication unit 70. The meter control unit 10 of the vehicle display apparatus 1 receives the synchronization signal via the communication unit 20. Control may be provided to synchronize the display based on the synchronization signal. Conversely, the meter control unit 10 of the vehicle display apparatus 1 may transmit a synchronization signal to the navigation control unit 60 of the navigation apparatus 50 for synchronous display.

There may be another method of synchronously displaying both navigation images. For example, the ignition (IGN) switch is turned on (see (b) in FIG. 3) to start the timer. After lapse of a specified time period, the navigation control unit 60 of the navigation apparatus 50 and the meter control unit 10 of the vehicle display apparatus 1 each start displaying navigation images. However, the meter control unit 10 may greatly differ from the navigation control unit 60 as to the performance. When the meter control unit 10 and the navigation control unit 60 are controlled independently, both may not synchronize with each other due to control accuracies of the respective control units. To facilitate the synchronization, one of them may function as a master and trigger control over the other.

(4) The navigation apparatus 50 may be provided with a speaker (voice output unit) to add a voice guidance function, for example. Further, a microphone (voice input unit) may be provided to add a function that enables input of a voice instruction from a driver. In addition to the operation switch group 61, there may be a case of adding a function that allows a driver to operate a remote controller for instruction input. In this case, it is only necessary to provide a remote controller sensor that receives a signal from the remote controller operated by the driver. These considerations belong to known technologies and a detailed description is omitted.

2. Second Embodiment (Construction Description)

Figure 4:
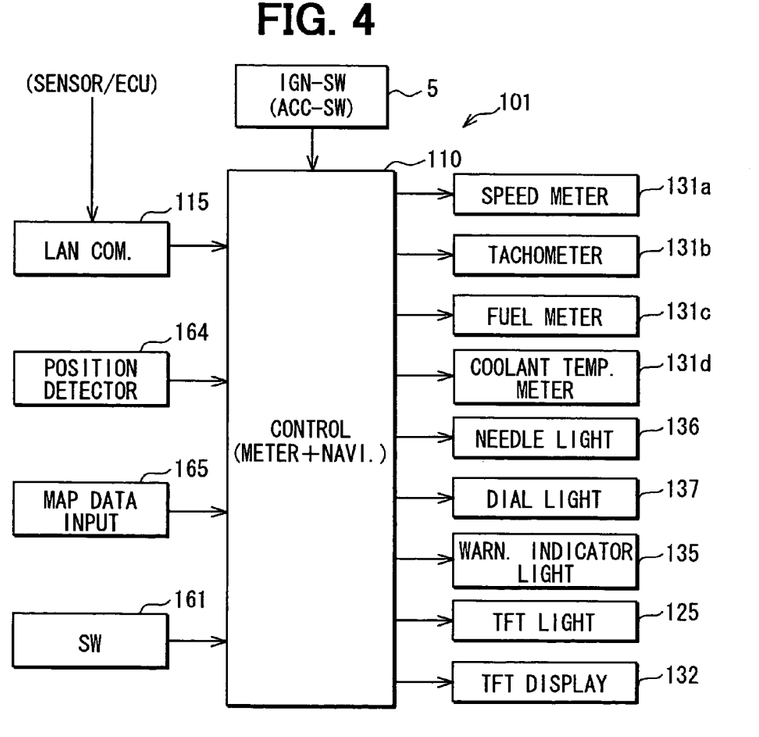
FIG. 4 is a block diagram showing an overview construction of a vehicle display apparatus according to a second embodiment.
Figure 5:
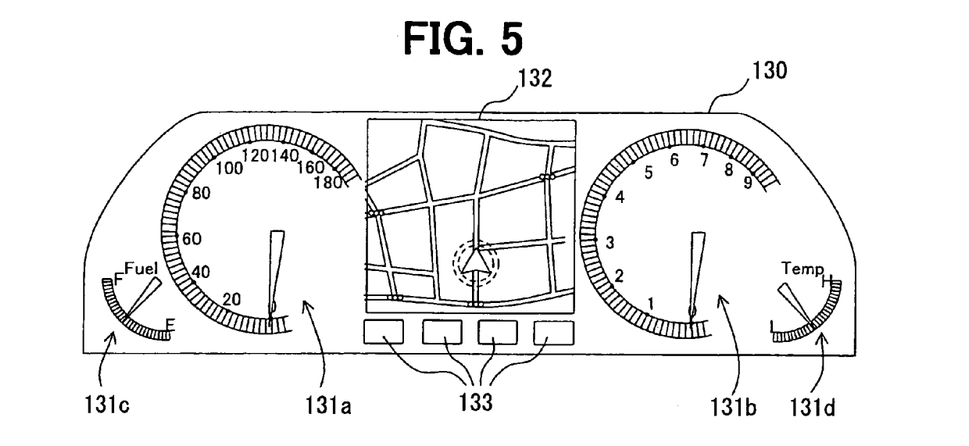
FIG. 5 is a front view of the vehicle display apparatus according to the second embodiment.

FIG. 4 is a block diagram showing an overview construction of a vehicle display apparatus 101. FIG. 5 is a front view of the vehicle display apparatus 101. The above-mentioned vehicle display apparatus 1 according to the first embodiment assumes a so-called digital meter that also displays the meter as an image. By contrast, the vehicle display apparatus 101 according to the second embodiment assumes a mechanical meter.

The vehicle display apparatus 101 includes a meter control unit 110, an interior LAN communication unit 115, a speed meter 131*a*, a tachometer 131*b*, a fuel meter 131*c*, a coolant temperature meter 131*d*, a needle light source 136, a dial light source 137, warning indicators 133 (see FIG. 5), a warning indicator light source 135, a TFT light source 125, a TFT display device 132, an operation switch group 161, a position detector 164, and a map data input device 165. The position detector 164 detects the vehicle's current position. The map data input device 165 supplies data from a map storage medium that records map data, voice data, and the like.

The interior LAN communication unit 115 provides communication between various ECUs and alarm sensors connected to an interior LAN (not shown). The ECUs include an engine ECU and an AT-ECU, for example. The alarm sensors include a brake warning indicator, an oil pressure warning indicator, an exhaust temperature warning indicator, a battery warning indicator, an ABS warning indicator, an engine warning indicator, and a door warning indicator.

The speed meter 131*a* indicates the vehicle speed and operates based on a signal from the meter control unit 110. The control unit 110 acquires the vehicle's speed information from a speed sensor (not shown) via the interior LAN communication unit 115. The control unit 110 supplies the speed meter 131 a with a signal corresponding to the speed information.

The tachometer 131*b* indicates the engine revolution and operates based on a signal from the meter control unit 110. The control unit 110 acquires information about the engine revolution from an engine ECU (not shown) via the interior LAN communication unit 115 and supplies the tachometer 131*b* with a signal corresponding to the revolution information.

The fuel meter 131*c* indicates the fuel level and operates based on a signal from the meter control unit 110. A fuel tank is provided with a sensor (not shown) to detect the fuel level. The control unit 110 acquires the fuel level information from this sensor via the interior LAN communication unit 115 and supplies the fuel meter 131*c* with a signal corresponding to the fuel level information.

The coolant temperature meter 131*d* indicates the temperature of the engine coolant and operates based on a signal from the meter control unit 110. The control unit 110 acquires coolant temperature information from a sensor (not shown) for detecting the engine coolant temperature via the interior LAN communication unit 115. The control unit 110 outputs a signal corresponding to the coolant temperature information to the coolant temperature meter 131*d*.

The needle light source 136 is provided for each needle of the meters 131*a*, 131*b*, 131*c*, and 131*d*, and illuminates the needle. The light source can be various illuminators such as a LED.

Similarly to the needle light source 136, the dial light source 137 is provided for each dial of the meters 131*a*, 131*b*, 131*c*, and 131*d*, and illuminates the dial.

The warning indicators 133 include, for example, a brake warning indicator, an oil pressure warning indicator, an exhaust temperature warning indicator, a battery warning indicator, an ABS warning indicator, an engine warning indicator, and a door warning indicator. Each warning indicator 133 is provided with an indicator that represents each alarm content diagrammatically, alphabetically or numerically. The indicator itself follows the known technology and a detailed description is omitted.

The warning indicator light source 135 is provided for illuminating each of the above-mentioned warning indicators 133. The TFT light source 125 is provided for the TFT display device 132.

The TFT display device 132 is provided between the speed meter 131*a* and the tachometer 131*b* in the instrument panel. The TFT display device 132 includes a liquid crystal display or an organic EL display. The TFT display device 30 has a color image display function and displays navigation images (e.g., a map near the current position, an icon representing the current position, and a guidance chart for route guidance).

The operation switch group 161 includes a touch panel also used as the display surface of the TFT display device 132 and is used to input various instructions from a driver. The touch panel and the TFT display device 132 are integrally layered.

The position detector 164 is provided with a GPS (Global Positioning System) receiver, a gyroscope, and a distance sensor. The GPS receiver receives radio waves from an artificial satellite for GPS via a GPS antenna (not shown) and outputs a received signal. The gyroscope detects the magnitude of rotational motion applied to a vehicle. The distance sensor detects a traveled distance based on the acceleration or the like in the forward and backward directions of the vehicle. The navigation control unit 110 calculates the vehicle position, orientation, speed, and the like based on output signals from these sensors.

The map data input device 165 is supplied with various data from a map data storage medium (not shown) such as a hard disk and DVD-ROM. The map data storage medium stores map data (node data, link data, cost data, background data, road data, name data, mark data, intersection data, facility data, and the like), audio data for guidance, voice recognition data, and the like. These data may be supplied via a network instead of using the map data storage medium.

The meter control unit 110 chiefly includes a known microcomputer composed of a CPU, ROM, RAM, SRAM, I/O, and a bus line connecting these components. The meter control unit 110 performs various processes based on programs stored in the ROM and the RAM. To control the meters, for example, the meter control unit 110 receives data from various ECUs via the interior LAN communication unit 115. Based on the data, the meter control unit 110 drives needles of the speed meter 131a, the tachometer 131b, the fuel meter 131c, and the coolant temperature meter 131d. Further, the meter control unit 110 turns on or off the needle light source 136, the dial light source 137, and the warning indicator light source 135. As an example of controlling the navigation, the meter control unit 110 calculates the vehicle's current position as a set of coordinates and a traveling direction based on signals detected by the position detector 164. The meter control unit 110 then allows the TFT display device 132 to display a map and the like near the current position read through the map data input device 165. As another example, the meter control unit 110 performs a route calculation process to calculate an optimum route from the current position to a destination based on map data and the destination. The map data is stored in the map data input device 165. The destination is determined in accordance with operations of the operation switch group 161. As still another example, the meter control unit 110 performs a route guidance process to guide the route by allowing the TFT display device 132 to display the calculated route.

The ignition (IGN) switch 5 is also connected to the meter control unit 110. When a driver operates an ignition key to turn on the IGN switch 5, the vehicle display apparatus 101 is supplied with the power to activate the components thereof.

(Description of Operations and Effects)

Operations of the vehicle display apparatus 101 will be described with reference to a time chart in FIG. 6.

Figure 6:
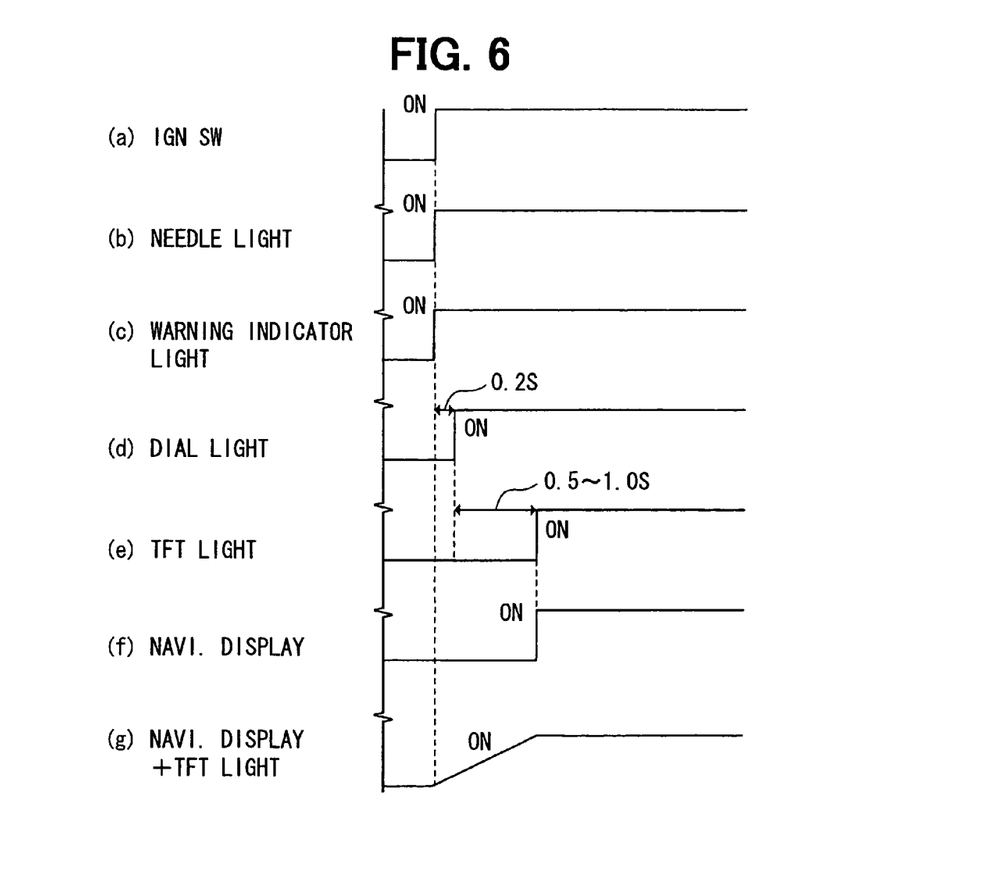
FIG. 6 is a time chart showing an operation of the vehicle display apparatus according to the second embodiment.

When the driver operates the ignition key to turn on the ignition (IGN) switch (see (a) in FIG. 6), the components of the vehicle display apparatus 101 become ready for operation. The meter control unit 110 then turns on the needle light source 136 and the warning indicator light source 135 (see (b) and (c) in FIG. 6). The meter control unit 110 keeps the needle light source 136 turned on for a specified time period (e.g., 0.2 seconds), and then turns on the dial light source 137 (see (d) in FIG. 6). That is, only the needles light for the speed meter 131a, the tachometer 131b, the fuel meter 131c, and the coolant temperature meter 131d. After lapse of the specified time period (e.g., 0.2 seconds), the dials light.

The meter control unit 110 in preference to the display of a navigation image on the TFT display device 132 keeps the dial light source 137 turned on for the specified time period, and then turns on the TFT light source 125 (see (e) in FIG. 6). The meter control unit 110 then starts displaying a navigation image on the TFT display device 132 (see (f) in FIG. 6). The specified time period is equivalent to 0.5 through 1.0 second, for example, long enough to visually check the meter display or meter indication.

In this manner, the navigation image is not displayed even when the light sources 135, 136, and 137 turn on for the speed meter 131a, the tachometer 131b, the fuel meter 131c, the coolant temperature meter 131d, and the warning indicators 133. The navigation image is displayed upon expiration of the specified time period after the dial light source 137 turns on. A driver can visually check the illuminated meters 131a through 131d and warning indicators 133 while no navigation image is displayed. When the inside of the instrument panel is used for mixed display of the meters 131a through 131d, the warning indicators 133, and the navigation image, it is possible to increase driver's attention to the more important meters 131a through 131d and warning indicators 133.

When a mechanical meter is used and a step motor drives a needle, a step-out condition may occur to disable an initial state from indicating the speed-0 position. It is especially important for the driver to check whether or not such initial state occurs.

Similarly to the first embodiment, the meter control unit 110 provides control to turn on or off the warning indicators 133 based on a detection result from the sensor corresponding to each of the warning indicators 133. When the IGN switch 5 is turned on, the meter control unit 110 once turns on all the warning indicators 133 for checking the initial state, and then turns off the indicators when the initial state is normal. When the driver visually checks whether or not all the warning indicators 133 turn on, it is preferable to ensure the state where no navigation image is displayed for a specified time period. The embodiment turns on the warning indicators 133 for 0.7 through 1.2 seconds, and then displays the navigation image. The driver can more carefully watch the warning indicator image until the navigation image is displayed.

The meter control unit 110 once turns on all the warning indicators 133 to check the initial state and turns off them thereafter unless actually needed. When the IGN switch 5 remains turned on for a specified time period such as three seconds, for example, the warning indicators 133 automatically turn off upon expiration of that time period. When the engine starts, the warning indicators 133 turn off. A known technique can be used to control the warning indicators 133 after the IGN switch 5 is turned on. This is not a mainstream of the invention and a detailed description is omitted.

Simultaneously displaying the meters 131a through 131d, the warning indicators 133, and the navigation image provides an unattractive visual effect and tends to make a driver inattentive to a display content. Displaying those images with time lags may enhance the visual effect. The driver can be given a fresh impression. As a result, it is also possible to promote the driver's concern for the display contents.

With respect to the meters 131a through 131d, the meter control unit 110 turns on the needle light source 136 for a specified time period (e.g., 0.2 seconds), and then turns on the dial light source 137. In this manner, the meter control unit 110 first turns on the needle without the dial turned on, and then turns on the dial. This further enhances the visual effect and promotes the driver's concern for the meters 131*a* through 131*d*.

Let us suppose that turning on the accessory (ACC) switch activates the navigation apparatus 50. There may be a case of displaying a first opening image presenting the navigation apparatus' manufacturer name and product name, and then a map image and the like. The opening image belongs to the navigation image and is therefore one of "specified images." In such case, the navigation apparatus displays the meters 131*a* through 131*d* and the warning indicators 133 for a specified time period long enough for visual recognition, then the opening image, and finally the map image and the like.

(Modifications)

(1) The second embodiment is not connected to the navigation apparatus 50. Similarly to the first embodiment, the second embodiment may be connected to the navigation apparatus 50. Conversely, the vehicle display apparatus 1 according to the first embodiment can be used standalone not connected to the navigation apparatus 50.

(2) According to the above-mentioned description, the meter control unit 110 starts lighting the needle light source 136, the dial light source 137, and the warning indicator light source 135 in preference to the display of a navigation image on the TFT display device 132. However, the purpose is to increase driver's attention to the more important meters 131*a* through 131*d* and the warning indicators 133. For this purpose, it is only necessary to start lighting the needle light source 136, the dial light source 137, or the warning indicator light source 135, and then make the navigation image relatively indistinctive for a specified period.

There may be provided display control as shown in (g) in FIG. 6. That is, turning on the IGN switch 5 starts displaying the navigation image itself. However, the brightness of the TFT light source 125 is increased gradually. Control is provided to turn on the dial light source 137 for a specified time period (e.g., 0.5 through 1.0 second), and then maximize the brightness of the TFT light source 125. This control provides the same effect. Gradually increasing the brightness of the TFT light source 125 can provide a user with an impression that the navigation image gradually becomes clear. This is also preferable for the visual effect.

(3) According to the above-mentioned description, the IGN switch 5 is connected to the meter control unit 110. When the driver operates the ignition key to turn on the ignition (IGN) switch, the components of the vehicle display apparatus 101 become ready for operation. Further, the accessory (ACC) switch may be connected to the meter control unit 110. When the driver operates the ignition key to turn on the accessory (ACC) switch, the components of the vehicle display apparatus 101 may become ready for operation.

3. Third Embodiment (Construction Description)

The system construction itself is similar to the vehicle display apparatus 1 and the navigation apparatus 50 connected thereto according to the first embodiment shown in FIG. 1. Accordingly, the same components are not described. Differences are additional signals applied to the meter control unit 10 via the interior LAN communication unit 15. These signals include image signals representing the rear and sides of the vehicle and a signal from a sensor to detect whether or not to wear a seat belt.

Figure 7:
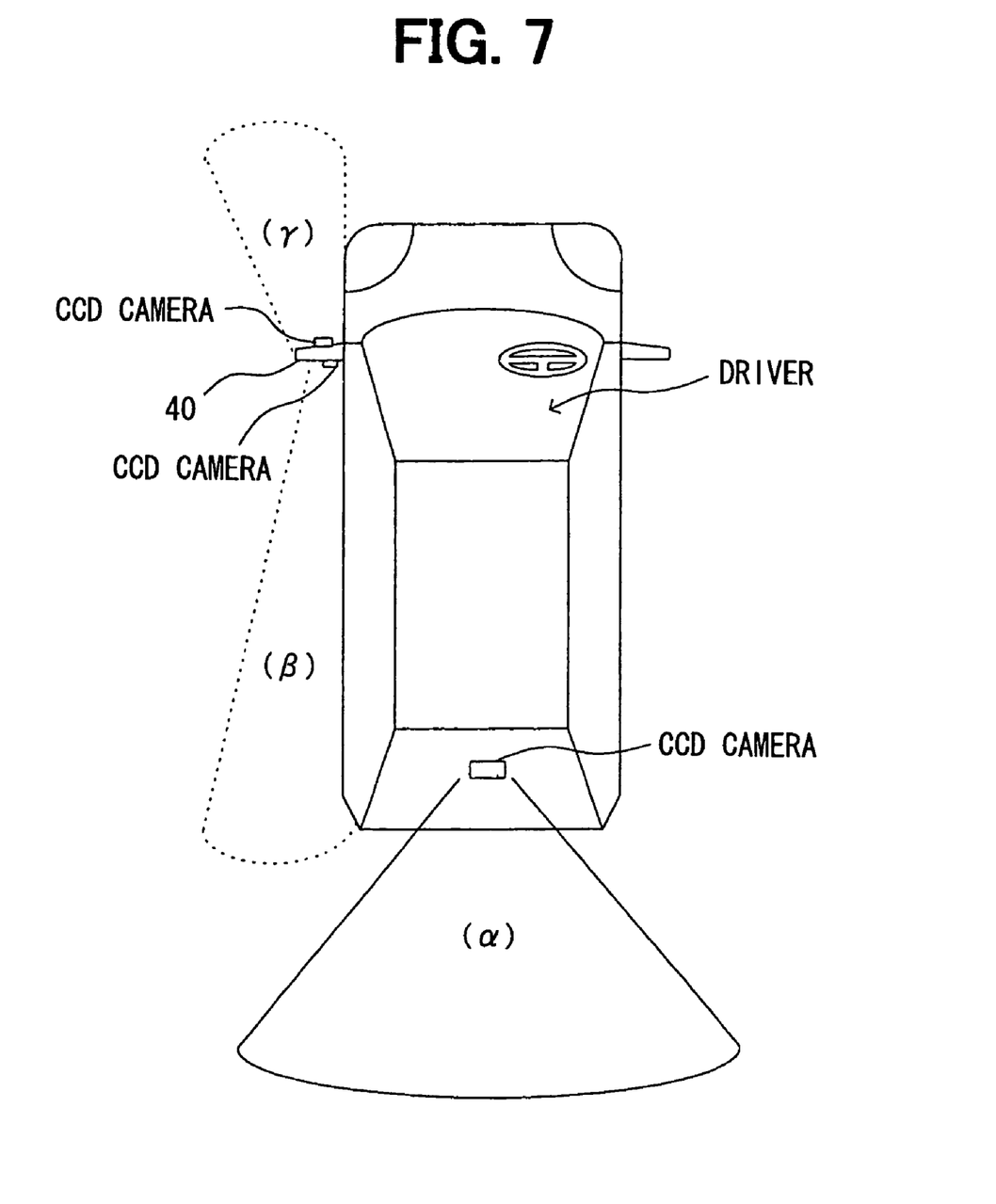
FIG. 7 schematically shows a construction for monitoring a vehicle backward and sideward.

Specifically, FIG. 7 shows rear view ($\alpha$). A CCD (Charge-Coupled Device) camera is provided to capture an image at the rear of the vehicle. FIG. 7 also shows side rear view ($\beta$) and side front view ($\gamma$). CCD cameras are provided to capture an image at the side of the vehicle.

To capture an image at the side of the vehicle, the CCD cameras are provided for a side mirror 40 opposite the driver's seat as shown in FIG. 7. The side mirror 40 is provided with one CCD camera to capture an image corresponding to the side rear view ($\beta$) and the other CCD camera to capture an image corresponding to the side front view ($\gamma$). Images captured by the three CCD cameras are processed in a vicinity monitoring ECU (not shown). The processed image is supplied to the meter control unit 10 via the interior LAN and the interior LAN communication unit 15.

Figure 8A:
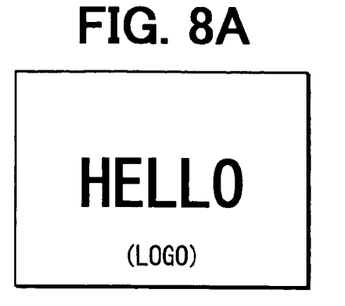
FIGS. 8A to 8F show display examples according to a third embodiment.
Figure 8B:
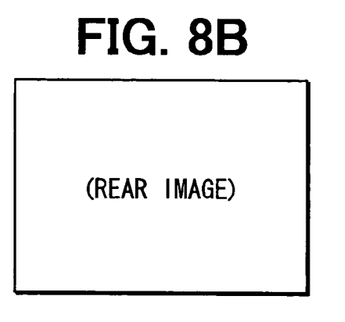
Figure 8C:
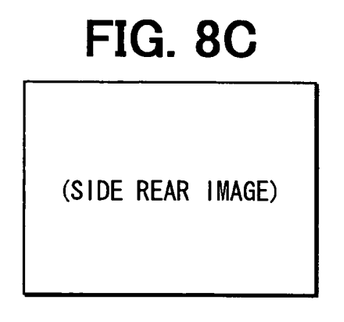
Figure 8D:
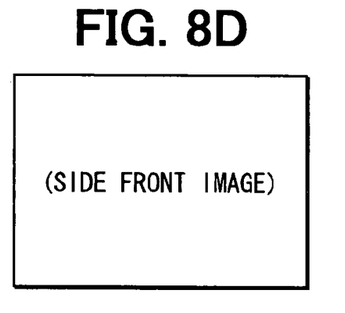
Figure 8E:
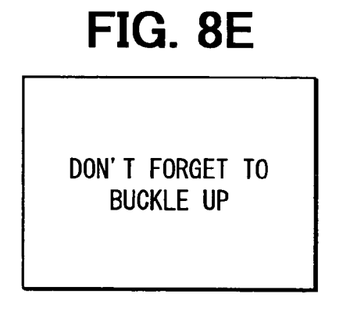
Figure 8F:
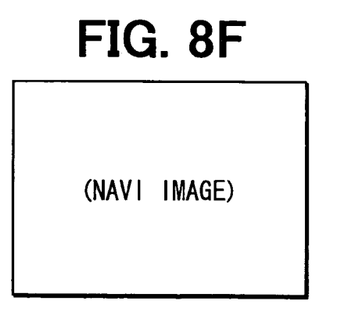

As mentioned in the first embodiment, the meter control unit 10 receives data from the various ECUs via the interior LAN communication unit 15 and, based on this data, uses the meter display area 31 of the TFT display device 30 to display the vehicle speed, engine revolution, fuel level, and coolant temperature in an analog fashion. Based on image data transmitted from the navigation apparatus 50, the meter control unit 10 uses the navigation display area 32 of the TFT display device 30 to display a map image. Further, the meter control unit 10 acquires alarm sensor states from the various alarm sensors via the interior LAN communication unit 15. Based on the acquired alarm sensor states, the meter control unit 10 uses the vehicle state display area 33 of the TFT display device 30 to display a warning indicator image indicating the contents of the alarm, when needed. Moreover, the meter control unit 10 can display the above-mentioned "images at the vehicle's rear and side" in the navigation display area 32. As will be discussed in more detail below, the meter control unit 10 can display a "greeting image" as shown in FIG. 8A and an "alerting image" as shown in FIG. 8E in the navigation display area 32.

(Description of Operations and Effects)

Figure 9:
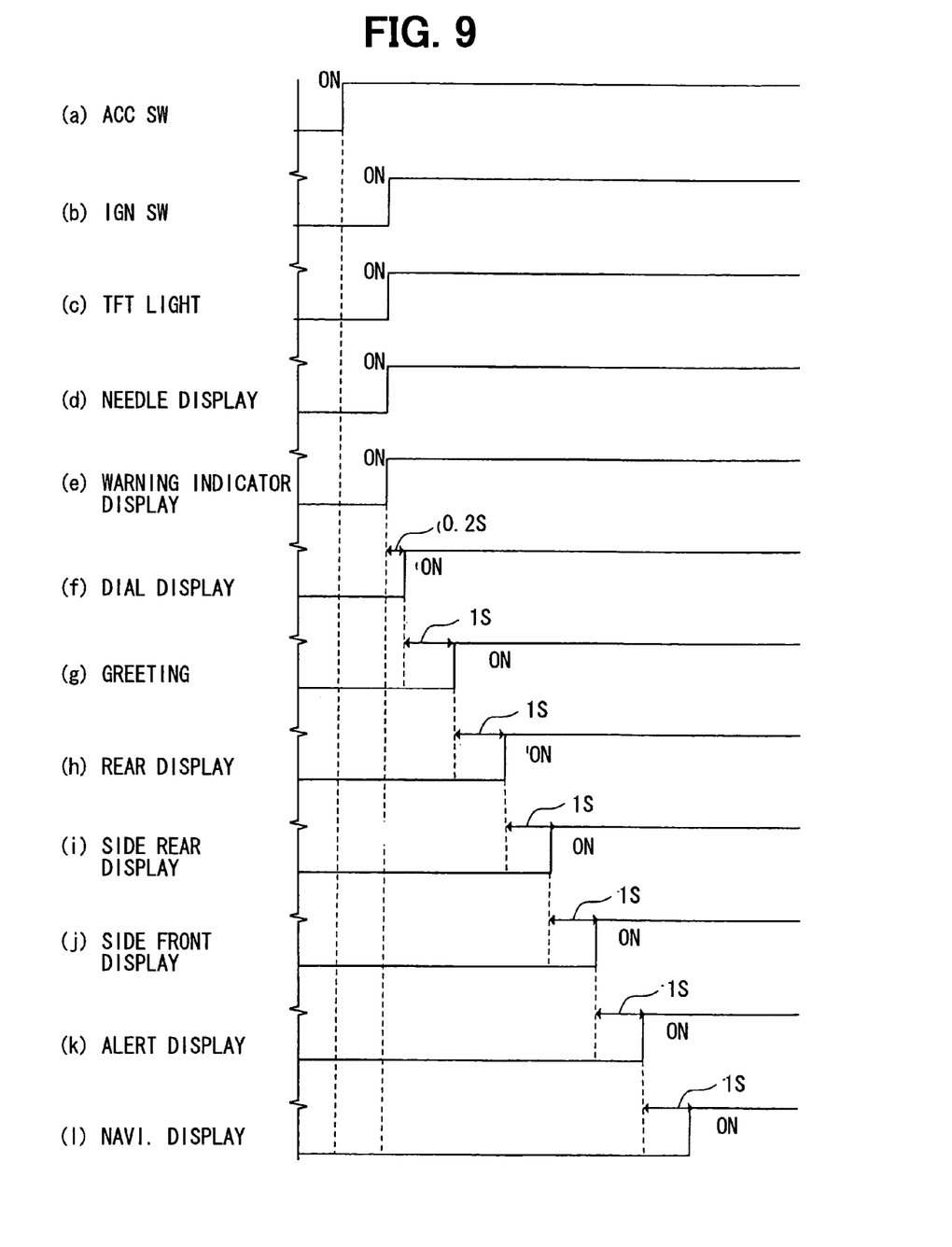
FIG. 9 is a time chart showing an operation of a vehicle display apparatus according to the third embodiment.

The following describes operations of the vehicle display apparatus 1 according to the third embodiment with reference to a time chart in FIG. 9 and screen examples in FIGS. 8A to 8F.

When the driver operates the ignition key to turn on the accessory (ACC) switch (see (a) in FIG. 9), the components of the navigation apparatus 50 become ready for operation. The navigation control unit 60 turns on the TFT light source 62.

When the driver further operates the ignition key to turn on the ignition (IGN) switch (see (b) in FIG. 9), the components of the vehicle display apparatus 1 become ready for operation. The meter control unit 10 turns on the TFT light source 25 (see (c) in FIG. 9) and starts displaying images on the TFT display device 30.

The TFT display device 30 displays meter images (speed meter image 31*a*, tachometer image 31*b*, fuel level meter image 31*c*, and coolant temperature meter image 31*d*) in the meter display area 31 (see (d) and (f) in FIG. 9 for the display time sequence) and a warning indicator image in the vehicle state display area 33 (see (e) in FIG. 9 for the display time sequence) earlier than "greeting image," "images at the vehicle's rear and side," "alerting image," and "navigation image" (see (g) to (l) in FIG. 9 for the display time sequence). As shown in FIGS. 8A to 8F, the images are actually displayed in the order of "greeting image," vehicle's "rear image," vehicle's "side rear image," the vehicle's "side front image," "alerting image," and "navigation image." The following describes the time sequence of displaying the images including the meter images and the warning indicator image.

As shown in (d) and (e) in FIG. 9, the TFT display device 30 first displays needle images of the meter images (speed meter image 31*a*, tachometer image 31*b*, fuel level meter image 31*c*, and coolant temperature meter image 31*d*) and a warning indicator image in the vehicle state display area 33. Of the meter image, the TFT display device 30 displays the needle image, and then a dial image after lapse of a specified time period (e.g., 0.2 seconds) as shown in (f) in FIG. 9.

The TFT display device 30 displays the dial image for a specified time period, and then displays the navigation image in the navigation display area 32 as shown in (g) in FIG. 9. The specified time period may be set to one (1) second, for example, long enough to visually check the display of the meter images and the warning indicator image. As shown in FIG. 8A, the "greeting image" display contains, for example, a greeting message "Hello" at the center of the screen and a vehicle logo at the bottom of the screen.

Upon expiration of the specified time period (e.g., one (1) second) after displaying the "greeting image," the TFT display device 30 displays the "rear image" in the navigation display area 32 as shown in (h) in FIG. 9. Upon expiration of the specified time period (e.g., one (1) second) after displaying the "rear image," the TFT display device 30 displays the "side rear image" in the navigation display area 32 as shown in (i) in FIG. 9. Upon expiration of the specified time period (e.g., one (1) second) after displaying the "side rear image," the TFT display device 30 displays the "side front image" in the navigation display area 32 as shown in (j) in FIG. 9.

Upon expiration of the specified time period (e.g., one (1) second) after displaying the "side front image," the TFT display device 30 displays the "alerting image" in the navigation display area 32 as shown in (k) in FIG. 9. The "alerting image" display contains a message such as "Caution!! Don't forget to buckle up" call attention to a user. Upon expiration of the specified time period (e.g., one (1) second) after displaying the "alerting image," the TFT display device 30 displays the "navigation image (e.g., map image)" in the navigation display area 32 as shown in (l) in FIG. 9.

The above-mentioned "alerting image" is not displayed when the user wears the seat belt. The meter control unit 10 receives a signal from the sensor that determines whether or not the seat belt is worn. Based on this signal, the meter control unit 10 determines whether or not the user wears the seat belt. Only when the user does not wear the seat belt, the meter control unit 10 displays the "alerting image." When the user does not wear the seat belt, the meter control unit 10 does not display the "alerting image." Upon expiration of the specified time period after displaying the "side front image" in (j) in FIG. 9, the meter control unit 10 displays the navigation image.

At the time of starting displaying the meter images and the warning indicator image, the meter control unit 10 does not display the "greeting image," the "images at the vehicle's rear and side," the "alerting image," and the "navigation image" (see (g) to (l) in FIG. 9). The meter control unit 10 displays the "greeting image" and the subsequent images only after lapse of the specified time period long enough to visually check the meter images and the warning indicator image. The user can visually check the meter images 31a through 31d and the warning indicator image while the "greeting image" and the subsequent images are not displayed. The inside of the instrument panel may be used for mixed display of the meter images 31a through 31d, the warning indicator image, and the "greeting image" and the subsequent images. In such case, it is possible to increase driver's attention to the more important meter images 31a through 31d and the warning indicator image.

(Modifications)

(1) Though a detailed description is omitted, the contents of (Modifications) for the first embodiment can be applied to the third embodiment.

The third embodiment can be applied to a mechanical meter as described in the second embodiment.

(2) While FIG. 8A shows the "greeting image" as a still picture, the "greeting image" may be displayed as a moving picture, for example.

Each or any combination of sequences, processes, steps, or means explained in the above embodiments can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A vehicle display apparatus comprising:

display means provided in an instrument panel and including (i) a predetermined first display area for displaying a first image corresponding to relatively highly prioritized content and (ii) a predetermined second display area for displaying a second image corresponding to relatively less prioritized content, the first and second display areas being within a single display screen; and control means for providing control to allow the first image to become visibly distinctive at initiation of power supply and to allow the second image to be less distinctive than the first image until a specified time period, which starts from the initiation of power supply, elapses to allow the first image to be recognizable.

2. The vehicle display apparatus according to claim 1, wherein the control means provides control to start displaying the first image at the initiation of power supply and to then start displaying the second image when the specified time period, which starts from the initiation of power supply, elapses.

3. The vehicle display apparatus according to claim 2, wherein the first image includes at least part of a meter image.

4. The vehicle display apparatus according to claim 3, wherein the meter image includes a needle-type meter image with a needle and a dial, and the at least part of the meter image included in the first image includes the needle and the dial, and wherein, before displaying the second image is started, the first image is displayed such that the needle is displayed at the initiation of power supply and the dial is then displayed with an interval of a certain time period, which starts from the initiation of power supply.

5. The vehicle display apparatus according to claim 3, wherein the meter image includes a needle-type meter image with a needle and a dial, and the at least part of the meter image included in the first image is the needle, and wherein the dial of the needle-type meter image is displayed with an interval of a certain time period, which starts when displaying the second image is started.

6. The vehicle display apparatus according to claim 2, wherein the first image includes a vehicle state image, which includes a warning indicator image and which a driver confirms at the initiation of power supply.

7. The vehicle display apparatus according to claim 2, wherein the second image includes at least a navigation image.

8. The vehicle display apparatus according to claim 1, wherein the control means provides control to start to display the first image with a predetermined brightness at the initiation of power supply and to display the second image with a brightness, which gradually increases after the initiation of power supply and then reaches the predetermined brightness after lapse of the specified time period, which starts from the initiation of power supply.

9. The vehicle display apparatus according to claim 1, wherein a navigation image is obtained as the second image from a navigation apparatus and the control means synchronizes with the navigation apparatus in displaying the navigation image.

10. The vehicle display apparatus according to claim 1, further comprising:
a light source that illuminates a mechanical meter, which is substituted for the first display area of the display means in the instrument panel, wherein
the control means provides
light control to turn on the light source to illuminate the mechanical meter at the initiation of power supply to thereby allow the mechanical meter illuminated as the first image to become visibly distinctive, and
display control to allow the second image to be less distinctive than the mechanical meter illuminated as the first image until the specified time period, which starts from the initiation of power supply, elapses to allow the meter image illuminated as the first image to be recognizable.

11. A vehicle display apparatus comprising:
a light source that illuminates a mechanical meter in an instrument panel;
display means provided in the instrument panel; and
control means that provides
light control to turn on the light source to illuminate the mechanical meter at initiation of power supply and
display control to cause the display means to display a predetermined image to be less distinctive than the mechanical meter until a specified time period, which starts from the initiation of power supply, elapses to allow the mechanical meter to be recognizable.

12. The vehicle display apparatus according to claim 11, wherein the control means provides the display control to cause the display means to start to display the predetermined image when the specified time period, which starts from the initiation of power supply, elapses.

13. The vehicle display apparatus according to claim 12, wherein the light source includes a needle light source for illuminating a needle of the mechanical meter and a dial light source for illuminating a dial of the mechanical meter, and
wherein, before displaying the predetermined image is started, the needle light source is turned on at the initiation of power supply and the dial light source is then turned on with an interval of a certain time period, which starts from the initiation of power supply.

14. The vehicle display apparatus according to claim 12, wherein the light source includes a needle light source for illuminating a needle of the mechanical meter and a dial light source for illuminating a dial of the mechanical meter, and
wherein the needle light source is turned on at the initiation of power supply, the predetermined image is displayed when the specified time period, which starts from the initiation of power supply, elapses, and the dial light source is then turned on with an interval of a certain time period, which starts when displaying the predetermined image is started.

15. The vehicle display apparatus according to claim 12, further comprising:
a warning indicator light source for illuminating a warning indicator,
wherein the control means provides
the light control to further turn on the warning indicator light source to illuminate the warning indicator at the initiation of power supply and
the display control to cause the display means to start displaying the predetermined image when the specified time period, which starts from the initiation of power supply, elapses to allow the mechanical meter and the warning indicator to be recognizable.

16. The vehicle display apparatus according to claim 11, wherein the control means provides the display control to allow the display means to display the predetermined image with a brightness, which gradually increases after the initiation of power supply and then reaches a maximum when the specified time period, which starts from the initiation of power supply, elapses.

17. The vehicle display apparatus according to claim 16, further comprising:
a warning indicator light source for illuminating a warning indicator,
wherein the control means provides
the light control to further turn on the warning indicator light source to illuminate the warning indicator at the initiation of power supply and
the display control to allow the display means to display the predetermined image with the brightness, which gradually increases after the initiation of power supply and then reaches the maximum when the specified time period, which starts from the initiation of power supply, elapses to allow the mechanical meter and the warning indicator to be recognizable.

18. The vehicle display apparatus according to claim 11, wherein the predetermined image includes at least a navigation image.

19. The vehicle display apparatus according to claim 11, wherein a navigation image is obtained as the second image from a navigation apparatus and the control means synchronizes with the navigation apparatus in displaying the navigation image.

20. A method for displaying images in an instrument panel in a vehicle, the method comprising:
causing a first image, which corresponds to relatively highly prioritized content in a predetermined first display area in the instrument panel, to become visibly distinctive from initiation of power supply; and
causing a second image, which corresponds to relatively less prioritized content in a predetermined second display area in the instrument panel, to be less distinctive than the first image until a specified time period, which starts from the initiation of power supply, elapses to allow the first image to be recognizable,
the first and second display areas being within a single display screen.

21. The method for displaying images according to claim 20, wherein the first image includes at least part of a meter image.

* * * * *